(12) United States Patent
Lopes et al.

(10) Patent No.: US 11,993,494 B2
(45) Date of Patent: May 28, 2024

(54) RESCUE HOIST CABLE ANGLE EXCEEDANCE DETECTION ARRANGEMENT (71) Applicant: GOODRICH CORPORATION, Charlotte, NC (US)

(72) Inventors: David R. Lopes, Fullerton, CA (US); Bejan Maghsoodi, San Dimas, CA (US); Zachary Limas, Upland, CA (US); Steven D. Mahnken, Long Beach, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 4 days.

(21) Appl. No.: 17/828,929

(22) Filed: May 31, 2022

(65) Prior Publication Data
US 2022/0289533 A1 Sep. 15, 2022

Related U.S. Application Data (62) Division of application No. 16/035,384, filed on Jul. 13, 2018, now Pat. No. 11,401,136.

(51) Int. Cl.
B66D 1/28 (2006.01)
B64D 1/22 (2006.01)
(Continued)

(52) U.S. Cl.
CPC ............ B66D 1/28 (2013.01); B64D 1/22 (2013.01); B66D 1/36 (2013.01); B66D 1/485 (2013.01);
(Continued)

(58) Field of Classification Search
CPC .. B64D 1/22; G01C 1/00; G01B 21/22; G01L 5/04; B66D 1/36; B66D 1/54; B66D 1/485; B66D 1/60; B66D 1/28; B66D 1/38
See application file for complete search history.

(56) References Cited

U.S. PATENT DOCUMENTS 3,215,405 A * 11/1965 Walsh ..................... B64D 1/22
                                                                200/61.18
3,804,371 A    4/1974 Mills
(Continued)

FOREIGN PATENT DOCUMENTS

CN         86203492       5/1987
CN        103616048       3/2014
(Continued)

OTHER PUBLICATIONS

China National Intellectual Property Administration; Chinese Search Report dated Apr. 27, 2022 in Application No. 201910629329.7.
(Continued)

Primary Examiner — Sang K Kim
Assistant Examiner — Nathaniel L Adams
(74) Attorney, Agent, or Firm — SNELL & WILMER L.L.P.

(57) ABSTRACT

A hoist system may include an airframe, a cable disposed between the hoist assembly and a hook assembly, and a cable angle exceedance detection arrangement. The cable angle exceedance detection arrangement may include a housing comprising a first end and a second end, a payout disposed within the housing and comprising an aperture within an interior surface and disposed a first end and a second end of the payout, a detection member coupled to the housing, and a wiring assembly coupled to and disposed between the detection member and a controller, wherein the
(Continued)

controller is coupled with a display assembly via a communication assembly.

8 Claims, 10 Drawing Sheets

(51) Int. Cl.
  *B66D 1/36* (2006.01)
  *B66D 1/48* (2006.01)
  *B66D 1/54* (2006.01)
  *B66D 1/60* (2006.01)
  *G01C 1/00* (2006.01)
(52) U.S. Cl.
  CPC ............... *B66D 1/54* (2013.01); *B66D 1/60* (2013.01); *G01C 1/00* (2013.01)

(56) References Cited

U.S. PATENT DOCUMENTS

| | | | |
|---|---|---|---|
| 6,499,225 | B1 | 12/2002 | Steinich |
| 6,668,668 | B1 | 12/2003 | Peshkin |
| 8,141,260 | B2 | 3/2012 | Pellen |
| 10,723,602 | B2 | 7/2020 | Maghsoodi |
| 2010/0201970 | A1 | 8/2010 | Pellen |
| 2011/0137497 | A1* | 6/2011 | Jimenez ............... B64D 1/22 701/3 |
| 2014/0264209 | A1 | 9/2014 | Lin |

FOREIGN PATENT DOCUMENTS

| | | |
|---|---|---|
| DE | 832060 | 2/1952 |
| EP | 0875483 | 11/1998 |
| GB | 2296001 | 6/1996 |
| JP | H0627873 | 4/1994 |

OTHER PUBLICATIONS

China National Intellectual Property Administration; Chinese Second Office Action dated Jun. 9, 2022 in Application No. 201910629329.7.
China National Intellectual Property Administration, Chinese First Office Action dated Oct. 19, 2021 in Application No. 201910629329.7.
European Patent Office, European Search Report dated Dec. 4, 2019 in Application No. 19185853.9.
USPTO; Advisory Action dated Jan. 3, 2022 in U.S. Appl. No. 16/035,384.
USPTO; Final Office Action dated Oct. 22, 2021 in U.S. Appl. No. 16/035,384.
USPTO; Non Final Office Action dated Jan. 27, 2021 in U.S. Appl. No. 16/035,384.
USPTO; Requirement for Restriction/Election dated Aug. 24, 2020 in U.S. Appl. No. 16/035,384.
USPTO; Notice of Allowance dated Mar. 11, 2022 in U.S. Appl. No. 16/035,384.
China National Intellectual Property Administration, Chinese First Office Action dated Jan. 21, 2021 in Application No. 201910629329.7.
USPTO; Final Rejection dated Oct. 22, 2021 in U.S. Appl. No. 16/035,384.
European Patent Office, European Office Action dated Aug. 10, 2022 in Application No. 19185853.9.
European Patent Office, European Office Action dated Jan. 18, 2024 in Application No. 19185853.9.

* cited by examiner

RESCUE HOIST CABLE ANGLE EXCEEDANCE DETECTION ARRANGEMENT

CROSS REFERENCE TO RELATED APPLICATIONS

This application is a divisional of, and claims priority to and the benefit of, U.S. patent application Ser. No. 16/035,384, filed on Jul. 13, 2018, and entitled "RESCUE HOIST CABLE ANGLE EXCEEDANCE DETECTION ARRANGEMENT" which is incorporated by reference herein in its entirety.

FIELD

The present disclosure relates generally to cable hoists, and more particularly to a rescue hoist assembly having a cable angle exceedance detection arrangement.

BACKGROUND

Hoist and winches are commonly used on aircrafts and ships to haul, pull, raise, and lower heavy loads. The fleet-angle is the angle between the center axis of alignment (i.e., in a hoist, where the cable hangs if no force other than gravity were acting upon it) and the cable. An aircraft operator may need to accurately determine if the fleet-angle of the cable exceeds a certain value. Maintaining a safe fleet-angle may prevent excessive load on the hoist and/or aircraft. Upon notification that a fleet angle exceeds a certain value, an aircraft operator may make adjustments to the velocity or position of the aircraft.

SUMMARY

According to various embodiments, a cable angle exceedance detection arrangement is provided. The cable angle exceedance detection arrangement may include a housing having an aperture extending therethrough defining an axis, the aperture being configured to allow a cable to extend through the housing from a first end of the housing, wherein the cable is aligned with the axis, to a second end of the housing. The cable angle exceedance detection arrangement may include a detection member coupled to the housing and configured to be contacted by the cable when a fleet angle defined between the axis and the cable at the second end of the housing exceeds a selected value. According to various embodiments, the detection member may include a conductive material. According to various embodiments, the cable angle exceedance detection arrangement may include a cap positioned downstream of at least a portion of the detection member. According to various embodiments, the cable angle exceedance detection arrangement may include an insulator disposed between the detection member and the cap. According to various embodiments, the cable angle exceedance detection arrangement may include an anti-rotation feature coupled to the detection member. According to various embodiments, the anti-rotation feature comprises a first tab and a second tab, wherein the first tab and the second tab are coupled to the detection member. According to various embodiments, the cable angle exceedance detection arrangement may include a wiring assembly coupled to the detection member and disposed between the detection member and a display assembly. According to various embodiments, contact between the cable and the detection member may initiate a signal sent from the wiring assembly to the display assembly.

According to various embodiments, a hoist system is described herein. The hoist system may include an airframe mechanically coupled to a hoist assembly. The hoist system may include a cable disposed between the hoist assembly and a hook assembly. The hoist system may include a cable angle exceedance detection arrangement. The cable angle exceedance detection arrangement may include a housing comprising a first end and a second end and a payout disposed within the housing and comprising an aperture within an interior surface and disposed a first end and a second end of the payout. The cable angle exceedance detection arrangement may also include a detection member coupled to the housing. The cable angle exceedance detection arrangement may also include a wiring assembly coupled to and disposed between the detection member and a controller, wherein the controller is coupled with a display assembly via a communication assembly. According to various embodiments, the detection member may include a conductive material. According to various embodiments, the cable angle exceedance detection arrangement may include a cap positioned downstream of at least a portion of the detection member. According to various embodiments, the cable angle exceedance detection arrangement may include an insulator disposed between the detection member and the cap. According to various embodiments, the cable angle exceedance detection arrangement may include an anti-rotation feature coupled to the detection member. According to various embodiments, the anti-rotation feature comprises a first tab and a second tab, wherein the first tab and the second tab are coupled to the detection member. According to various embodiments, the cable angle exceedance detection arrangement may include a cable positioned between the first end of the housing and the detection member, wherein contact between the cable and the detection member initiates a signal sent from the wiring assembly to the display assembly. According to various embodiments, a first end of the payout may have a smaller diameter than a second end of the payout.

According to various embodiments, a method of detecting when a fleet angle of a hoist system exceeds a selected value is described. In various embodiments, the method may include aligning a portion of a cable carrying a load with an axis of an aperture in a housing. In various embodiments, the method may include translating the cable to create the fleet angle defined by the cable and the axis. In various embodiments, the method may include contacting a detection member with the cable when the fleet angle exceeds a selected value. In various embodiments, the method may include sending a signal from a wiring assembly to a display assembly in response to the cable contacting the detection member. In various embodiments, the wiring assembly may be coupled with the detection member. In various embodiments, the method may include detecting the signal on the display assembly. In various embodiments, the method may include displaying an exceedance indicator on the display assembly in response to the display assembly detecting the signal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

Hoist load sensors and systems of the present disclosure may accurately measure the load imparted into the airframe of an aircraft through a hoist. A strain sensor measures strain or tension in guide element in a hoist. The signal from the strain gauge may then be processed and converted to determine the fleet angle of the rescue hoist cable.

Figure 1:
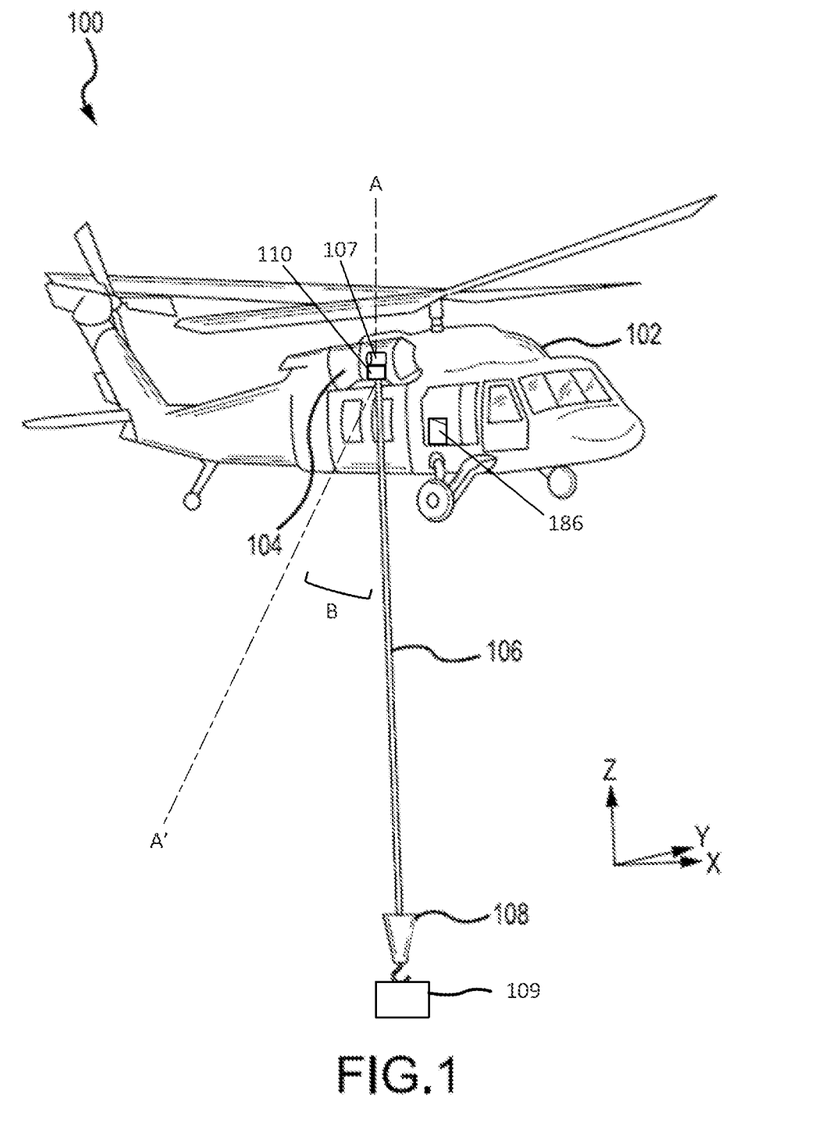
FIG. 1 illustrates a hoist assembly, hook assembly, and cable angle exceedance detection arrangement mechanically coupled, in accordance with various embodiments.

Referring now to FIG. 1, a hoist system 100 is shown, in accordance with various embodiments. Hoist system 100 includes a hoist assembly 104. Hoist assembly 104 may be coupled directly to airframe 102 or mechanically coupled to a boom that is mechanically coupled to airframe 102. In various embodiments, hoist assembly 104 may comprise drum 107 and cable angle exceedance detection arrangement (hereafter "CAEDA") 110.

Cable 106 may be wound about drum 107 within hoist assembly 104 and released or retracted based on rotation of the drum 107. Cable 106 may thus hang at various distances from hoist assembly 104 and airframe 102. A hook assembly 108 may be coupled to cable 106 at the free end of the cable opposite hoist assembly 104. Hook assembly 108 may hang from hoist assembly 104 on cable 106 and carry load 109. In various embodiments, load 109 may be coupled directly to cable 106.

Cable 106 may extend from hoist assembly 104 along axis A. Axis A may comprise where cable 106 hangs if no force other than gravity were acting upon it. Cable 106 and hoist assembly 104 may swing and/or translate relative to axis A. The angle between the cable 106 and axis A is referred to as fleet angle B. Fleet angle B may be caused in part by tension on cable 106 caused by load 109. Load 109 may cause cable 106 to translate relative to axis A causing fleet angle B. Fleet angle B may be increased or decreased by changing the position of load 109 and/or the position, speed, or velocity of airframe 102.

Figure 2:
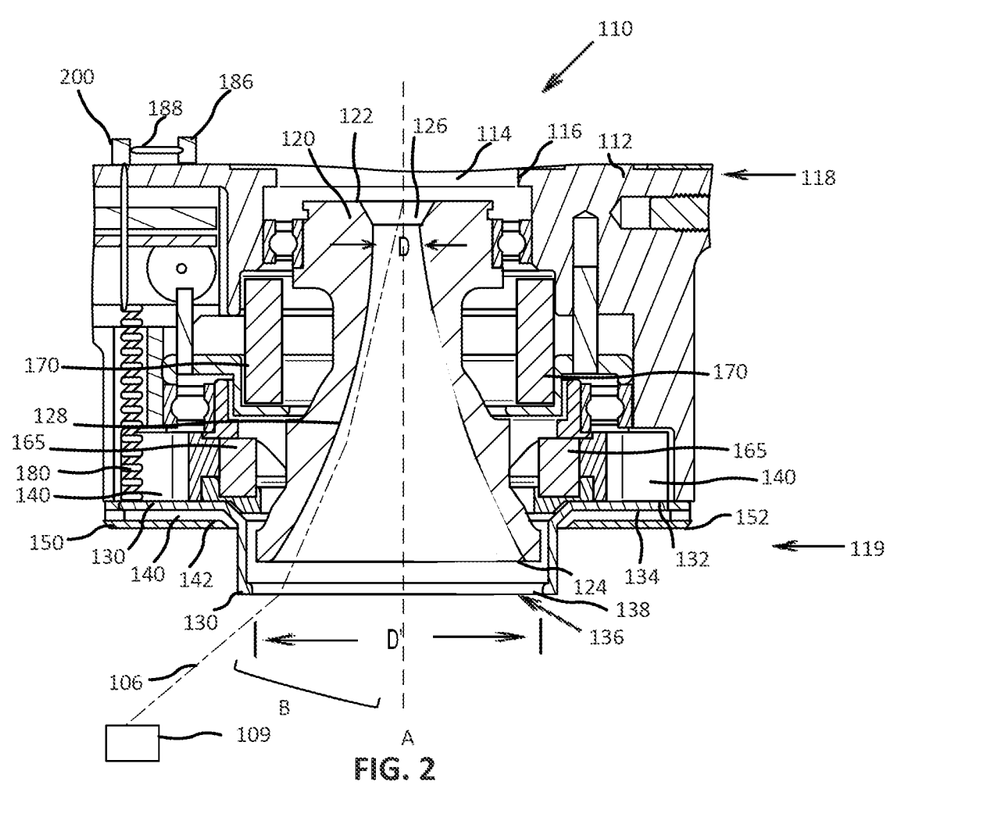
FIG. 2 illustrates a cap and detection member of a cable angle exceedance detection arrangement in accordance with various embodiments.
Figure 3:
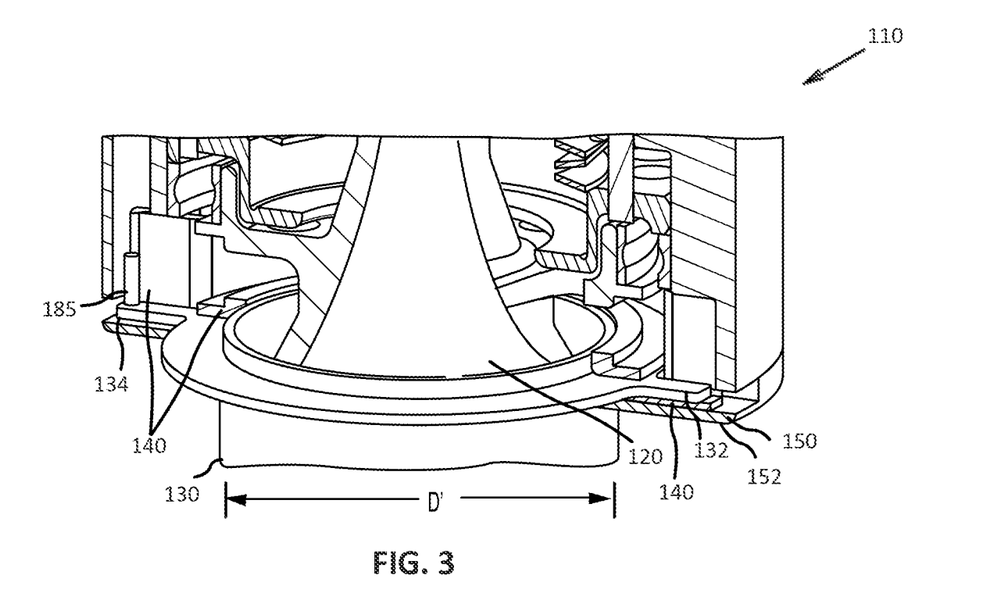
FIG. 3 illustrates a cross sectional view of a cable angle exceedance detection arrangement in accordance with various embodiments.
Figure 4:
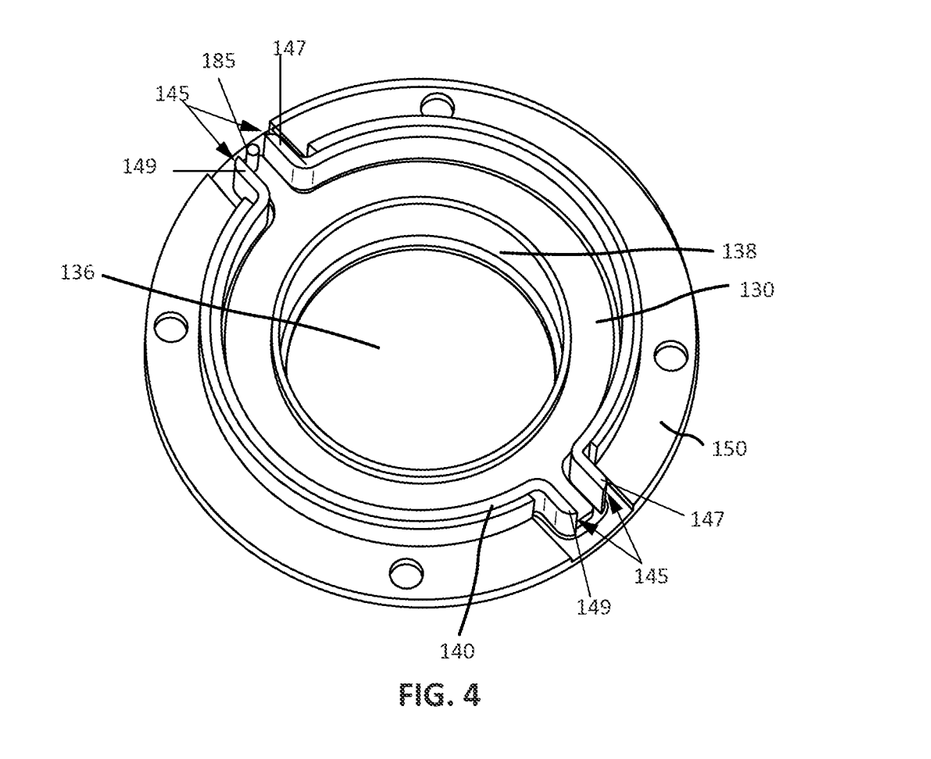
FIG. 4 illustrates a partial cross sectional view of a cable angle exceedance detection arrangement in accordance with various embodiments.

In various embodiments and with reference to FIG. 2-4, CAEDA 110 is illustrated. CAEDA may comprise housing 112 and payout 120. Housing 112 may comprise aperture 114 disposed at least partially within inner wall 116 of housing and spanning from first end 118 to second end 119 of housing. Stated another way, aperture 114 may be disposed within housing from first end 118 to second end 119. Aperture 114 may define axis A. Cable 106 may be aligned with axis A at first end 118 of housing 112.

Payout 120 may comprise a first end 122 and a second and 124. Payout 120 may comprise an aperture 126 disposed within inner surface 128 and spanning from first end 122 to second end 124. Diameter D of aperture 126 at first end 122 may be less than diameter D' of aperture 126 at second end 124. Cable 106 may be disposed within aperture 126 between drum 107 and hook assembly 108. Cable 106 may travel laterally within aperture 126 depending on a variety of factors, such as the movement of airframe 102 or load 109. Cable 106 may contact inner surface 128.

In various embodiments CAEDA 110 may comprise detection member 130. Detection member 130 may be disposed radially outward of at least a portion of second end 124 of payout 120. Detection member 130 may be coupled with insulator 140 along upstream surface 132 and downstream surface 134 of detection member 130. Detection member 130 may be disposed downstream of second end 124 of payout 120 and comprise aperture 136 disposed within surface 138 of detection member 130. Aperture 136 may have a diameter of D' or may have a diameter greater than D'. Detection member 130 may comprise a metal or other conductive material.

Detection member 130 may be coupled with insulator 140. Insulator 140 may be disposed between detection member 130 and cap 150. As shown in FIG. 4, insulator 140 may be disposed radially outward of detection member 130. Insulator 140 may prevent detection member 130 from making contact with a metal object other than wiring assembly 180. With reference to FIG. 2, cap 150 may be coupled with downstream surface 142 of insulator 140 at the second end 124 of payout 120. Cap 150 may be coupled to housing 112 to secure the contents of CAEDA 110 in place. Downstream surface 152 of cap 150 may comprise aluminum or other material configured to withstand strikes by load 109 or hook assembly 108.

In various embodiments, and with reference to FIG. 4, CAEDA 110 may comprise anti-rotation feature 145. Anti-rotation feature 145 may be coupled with detection member 130 to prevent detection member 130 from rotating relative to CAEDA 110. In various embodiments, anti-rotation feature 145 may be coupled with insulator 140. In various embodiments, anti-rotation feature 145 may be integral with insulator 140. In various embodiments, anti-rotation feature 145 may comprise first tab 147 and second tab 149. First tab 147 and second tab 149 may be coupled with detection member 130 to prevent detection member 130 from rotating relative to CAEDA 110. In various embodiments, CAEDA 110 may comprise a plurality of anti-rotation feature 145, first tab 147 and second tab 149. For example, CAEDA 110 may comprise two of anti-rotation feature 145, first tab 147 and second tab 149 disposed about CAEDA 110.

Figure 5:
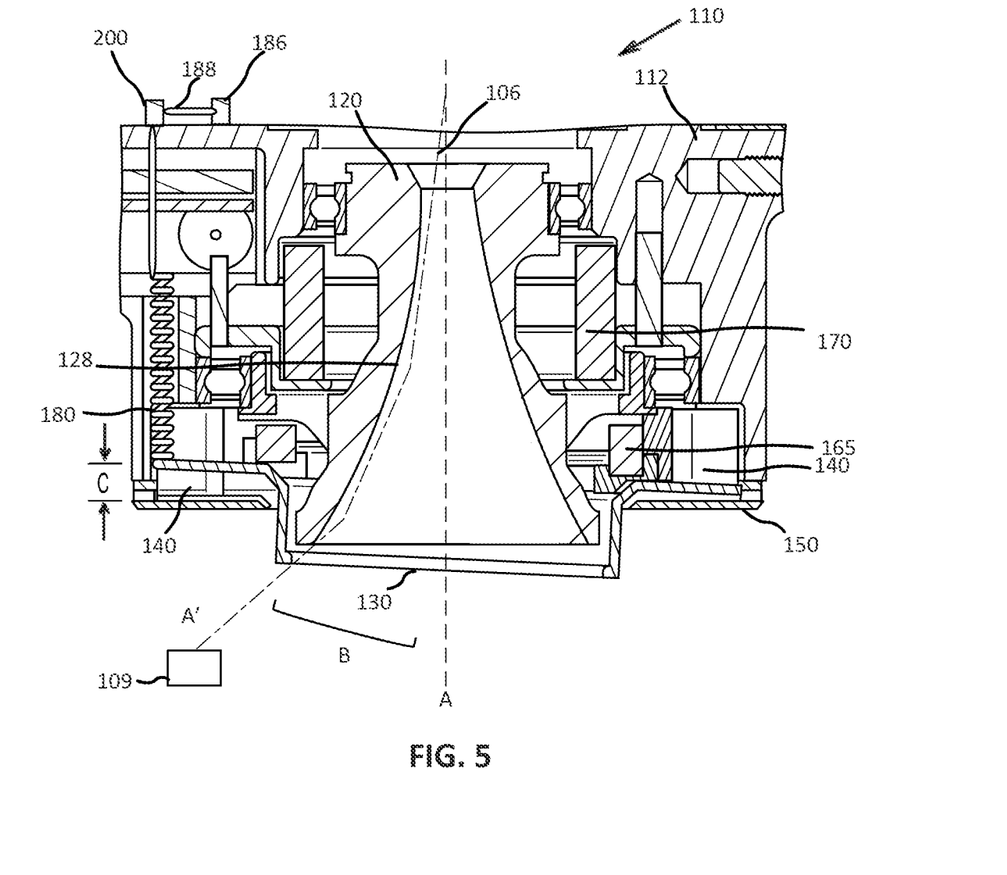
FIG. 5 illustrates a cable angle exceedance detection arrangement in accordance with various embodiments.

In various embodiments and with reference to FIG. 2 and FIG. 5, CAEDA 110 comprises spring 165 and spring 170. Spring 160 may hold second end 124 of payout 120 in position. Spring 170 may assist keeping detection member 130 in place.

In various embodiments and with reference to FIG. 5, cable 106 may exit CAEDA 110 along axis A' and contact at least one of inner surface 128 or detection member 130. Detection member 130 may be configured to be contacted by cable 106 when fleet angle B at second end 119 of housing 112 exceeds a selected value. Detection member 130 may be configured to be contacted by the cable 106 when load 109 causes tension in the cable 106 to generate fleet angle B of a certain value. For example, detection member 130 may be positioned so that it is contacted by cable 106 when fleet angle B exceeds thirty degrees. Upon contact with cable 106, a portion of detection member 130 may translate upstream such that the distance between the detection member 130 and cap 150 may increase comprise a distance C. The movement to distance C may decrease friction and damage to detection member 130 caused by contact with cable 106.

In various embodiments, CAEDA 110 may comprise wiring assembly 180. Wiring assembly 180 may supply a voltage to the detection member 130. Wiring assembly 180 may couple with detection member 130 at contact feature 185 and transmit a contact signal 184 to controller 200 in the event that cable 106 makes contact with detection member 130. For instance, if hook assembly 108 translates such that angle B exceeds a selected value, for example 30 degrees, cable 106 may make contact with inner surface 128 and/or detection member 130.

Figure 6:
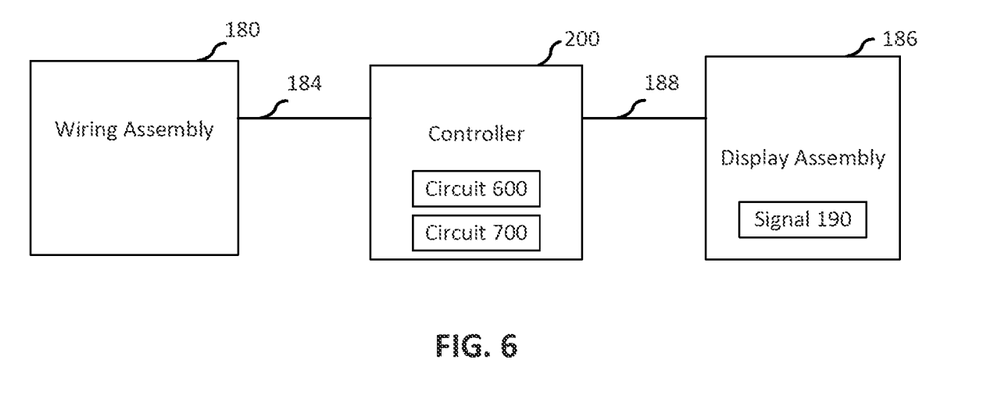
FIG. 6 illustrates a system for signaling contact between a cable and a detection member in accordance with various embodiments.
Figure 7A:
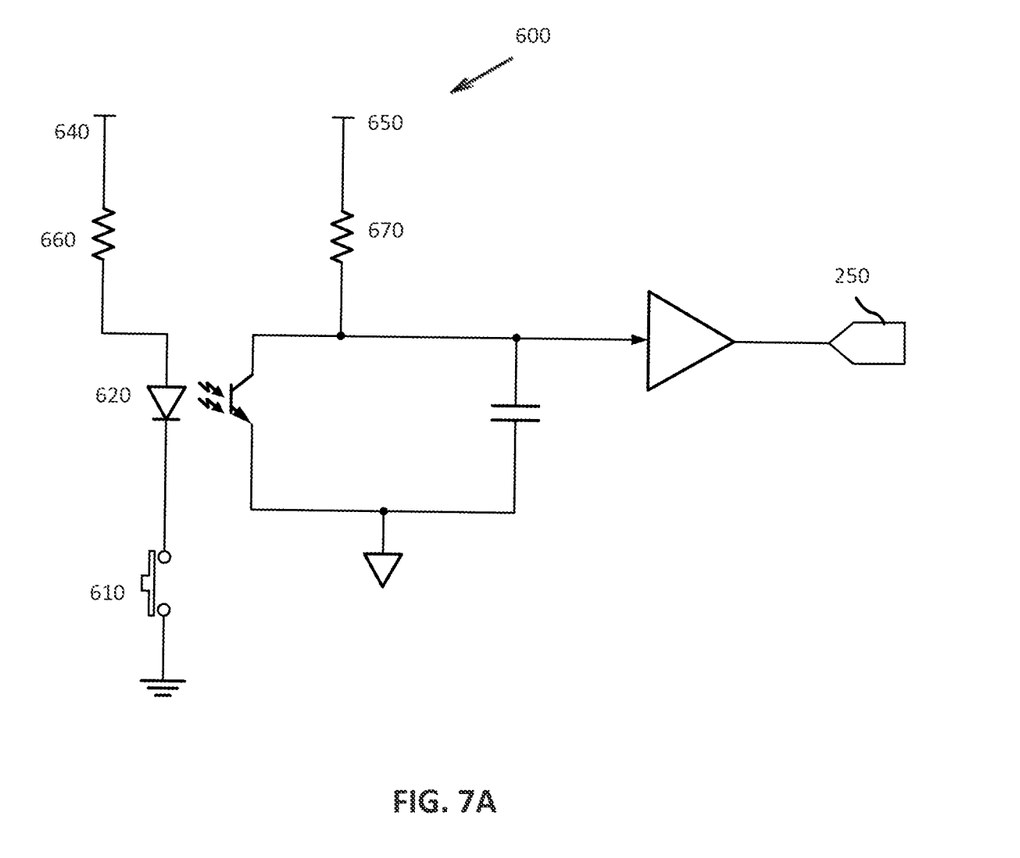
FIG. 7A illustrates a schematic drawing of a circuit used in a cable angle exceedance detection arrangement in accordance with various embodiments.
Figure 7B:
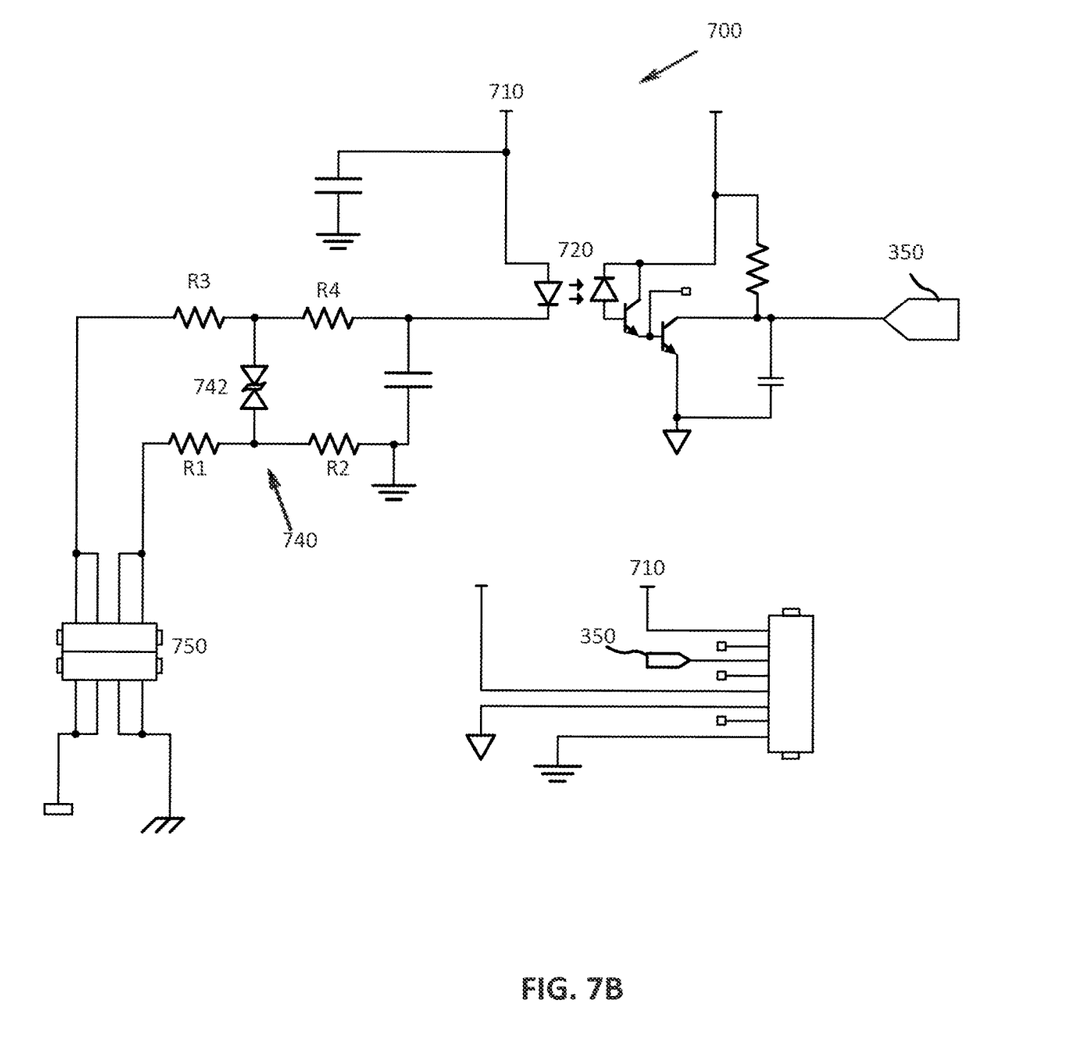
FIG. 7B illustrates a schematic drawing of a circuit used in a cable angle exceedance detection arrangement in accordance with various embodiments.

As discussed further in FIG. 6-7, when cable 106 contacts detection member 130, a signal 184 may be transmitted from wiring assembly 180 to controller 200. Controller 200 may comprise various configurations of circuitry, for example, circuit 600 and circuit 700. Controller 200 may be coupled with housing 112. Controller 200 may produce output 250 or output 350. Controller 200 may communicate signal output 250 or output 350 with display assembly 186 via communication assembly 188. Upon receiving output 250 or output 350, display assembly 186 may display exceedance indicator 190. Communication assembly 188 may comprise radio frequency signals or wiring. In various embodiments, display assembly 186 may comprise hardware and/or software configured to display contact signal 184. Display assembly 186 may be located on airframe 102 or housing 112.

With reference to FIG. 7A, a schematic drawing of a circuit 600 used in a cable angle detection arrangement 110 is shown in accordance with various embodiments. Circuit 600 may be coupled with airframe 102 or housing 112. When cable 106 makes contact with detection member 130, switch 610 closes, making an electrically complete circuit allowing current to flow through the anode of the optoisolator 620. The circuit path may be conducted through what is the anode portion of the optoisolator 620. Current flowing through optoisolator will activate the transistor within the optoisolator to create a logic level output 250 that may be detected. The output 250 may be used to alert hoist logic that a certain fleet angle was exceeded. Output 250 may be conveyed to display assembly 186 via communication assembly 188, which may indicate that the fleet angle was exceeded. In various embodiments, at least two voltage sources are used to maintain the hoist logic circuitry as independent of the detection circuit, and to keep that cable circuitry isolated as much as possible from your logic circuitry. The use of voltage source 640 and voltage source 650 provides a high dielectric isolation between the detection circuit and the logic circuitry. Voltage source 640 may comprise a highly galvanically isolated voltage source, for example, a DC to DC converter, that would provide a low voltage circuit for the detection. Voltage source 650, may run the logic of the hoist, and use a separate DC to DC convertor. Resistor 660 and resistor 670 are present to limit the amount of current that can be pulled through the optoisolator 620.

With reference to FIG. 7B, a schematic drawing of a circuit 700 used in a cable angle detection arrangement is shown in accordance with various embodiments. Circuit 700 may be located within airframe 102. Similar to in FIG. 6, if cable 106 makes contact with detection member 130, an electrically complete circuit allowing current to flow from voltage source 710 through the anode of the optocoupler 720. Current flowing through optocoupler 720 will activate the output 350 that may be detected by display assembly 186. Output 350 may be conveyed to display assembly 186 via communication assembly 188, which may indicate that the fleet angle was exceeded. In various embodiments, protection assembly 740 may clamp excess energy caused by lightning strikes or other events that cause electrostatic discharge or electromagnetic interference. Protection assembly 740 comprises a transorb assembly 742 between resistors R1-R4. Transorb assembly 742 clamps excess voltage, and resistors R1-R4 may limit the total amount of current that will flow in the circuit. Protection assembly 740 may allow current to flow through the circuit to operate the optocoupler 720. Connector 750 may be present to allow the connection or disconnection of the system.

Figure 8:
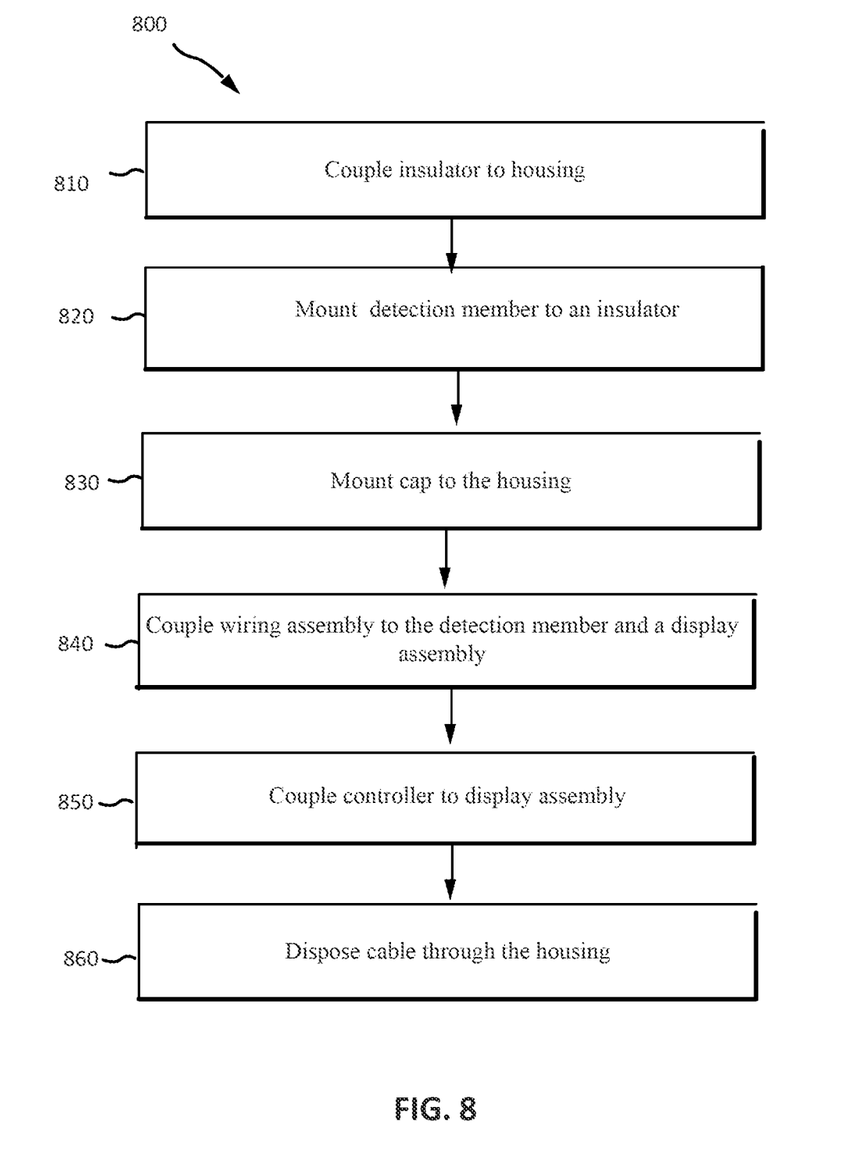
FIG. 8 illustrates a flow diagram of a process for manufacturing a cable angle exceedance detection assembly in accordance with various embodiments.
Figure 9:
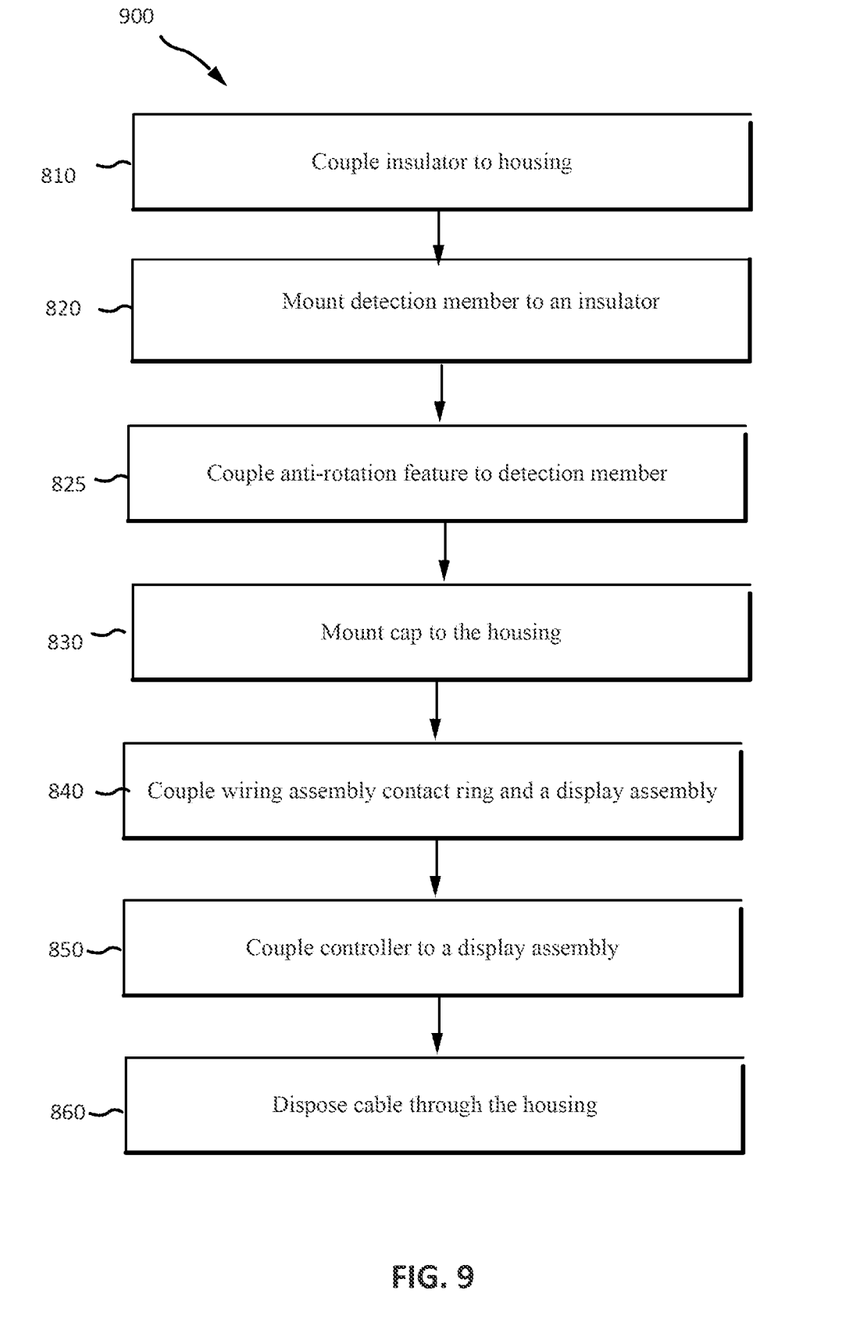
FIG. 9 illustrates a flow diagram of a process for manufacturing a cable angle exceedance detection assembly in accordance with various embodiments.

With reference to FIGS. 8-9, a method of manufacturing a cable angle exceedance detection assembly 800 is illustrated. In various embodiments, the method may include coupling an insulator to a housing (step 810). In various embodiments, the method may include mounting a detection member to an insulator (step 820). In various embodiments, the method may include mounting a cap to the housing (step 830). In various embodiments, the method may include coupling a wiring assembly to the detection member and a controller (step 840). In various embodiments, the method may include coupling the controller to a display assembly (step 850). In various embodiments, the method may include disposing a cable through the housing structure (step 860).

In various embodiments, a method of manufacturing a cable angle exceedance detection assembly 900 is illustrated. In various embodiments, the method may include coupling an anti-rotation feature to the detection member (step 825). In various embodiments, the anti-rotation feature comprises a first tab and a second tab, wherein the first tab and the second tab are coupled to the contact ring. In various embodiments, the anti-rotation feature is formed integral with the insulator.

Figure 10:
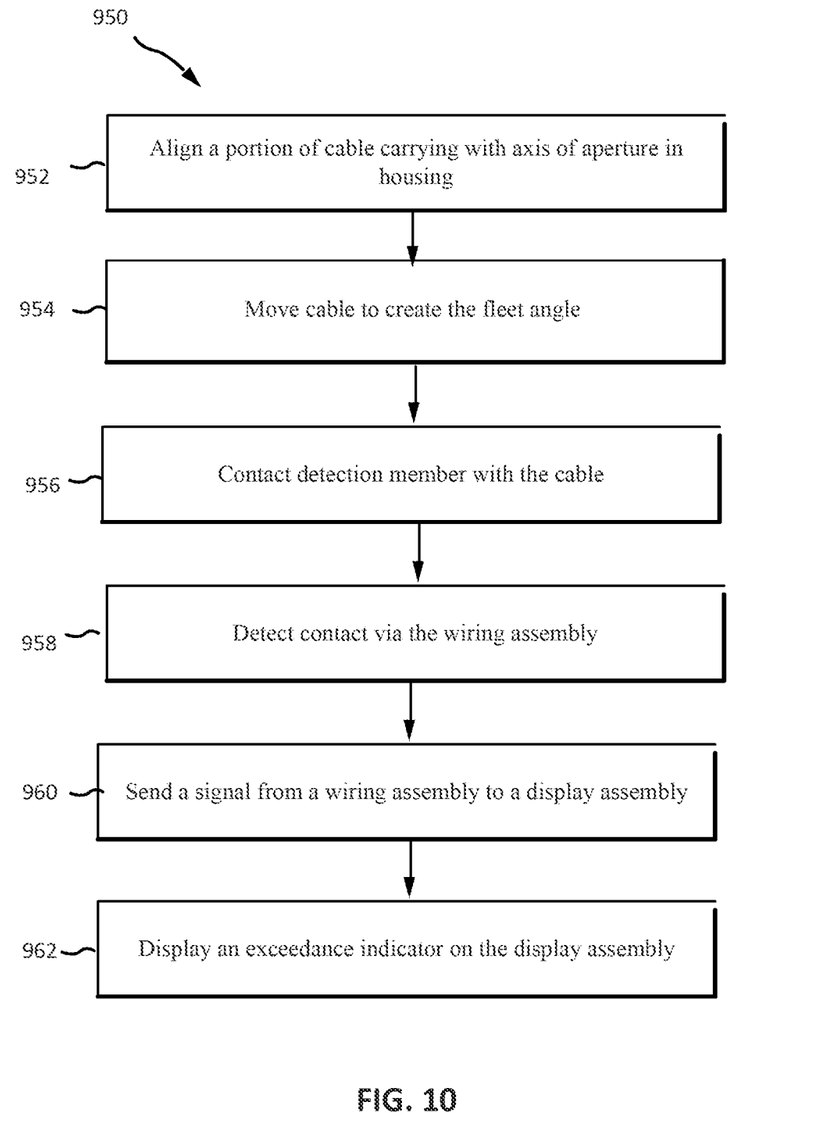
FIG. 10 illustrates a flow diagram of a method of detecting when a fleet angle of a hoist system exceeds a selected value in accordance with various embodiments.

With reference to FIG. 10, a method of detecting when a fleet angle of a hoist system exceeds a selected value 950 is illustrated. In various embodiments, the method may include aligning a portion of a cable carrying a load with an axis of an aperture in a housing (step 952). In various embodiments, the method may include translating the cable to create the fleet angle defined by the cable and the axis (step 954). In various embodiments, the method may include contacting a detection member with the cable when the fleet angle exceeds a selected value (step 956). In various embodiments, the method may include detecting the contact via the wiring assembly (step 958). In various embodiments, the method may include sending a signal from a wiring assembly to a display assembly in response to the wiring assembly detecting the contact (step 960). In various embodiments, the method may include displaying an exceedance indicator on the display assembly in response to the display assembly detecting the signal (step 962).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hoist system comprising,
    an airframe mechanically coupled to a hoist assembly;
    a cable disposed between the hoist assembly and a hook assembly;
    a cable angle exceedance detection arrangement, wherein the cable angle exceedance detection arrangement comprises:
        a housing comprising a first aperture extending therethrough defining an axis, the first aperture being configured to allow the cable to extend through the housing from a first end of the housing, wherein the cable is aligned with the axis, to a second end of the housing, wherein the cable is configured to move with respect to the housing in a first direction parallel to the axis from the second end of the housing towards the first end of the housing in response to being wound about a drum, and the cable is configured to move with respect to the housing in a second direction parallel to the axis from the first end of the housing towards the second end of the housing in response to being unwound from the drum;
        a payout disposed within the housing and comprising an aperture, wherein the aperture is disposed within an inner surface of the payout and wherein the aperture spans from a first end of the payout to a second end of the payout;
        a detection member coupled to the housing and configured to be contacted by the cable in response to a fleet angle defined between the axis and the cable at the second end of the housing exceeding a selected value, wherein the detection member is located more proximate to the second end of the housing than the first end of the housing; and
        a wiring assembly coupled to and disposed between the detection member and a controller, wherein the controller is coupled with a display assembly via a communication assembly.

2. The hoist system of claim 1, wherein the detection member comprises a conductive material.

3. The hoist system of claim 1, wherein the cable angle exceedance detection arrangement further comprises a cap positioned downstream of at least a portion of the detection member.

4. The hoist system of claim 3, wherein the cable angle exceedance detection arrangement further comprises an insulator disposed between the detection member and the cap.

5. The hoist system of claim 1, wherein the cable angle exceedance detection arrangement further comprises an anti-rotation feature coupled to the detection member.

6. The hoist system of claim 5, wherein the anti-rotation feature comprises a first tab and a second tab, wherein the first tab and the second tab are coupled to the detection member.

7. The hoist system of claim 1, wherein contact between the cable and the detection member initiates a signal sent from the wiring assembly to the display assembly.

8. The hoist system of claim 1, wherein the first end of the payout has a smaller diameter than the second end of the payout.

\* \* \* \* \*